(12) United States Patent
Gschwind

(10) Patent No.: US 10,126,976 B2
(45) Date of Patent: *Nov. 13, 2018

(54) INTEGRATING SIGN EXTENSIONS FOR LOADS

(71) Applicant: INTERNATIONAL BUSINESS MACHINES CORPORATION, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,138

(22) Filed: Feb. 17, 2017

(65) Prior Publication Data
US 2017/0160944 A1 Jun. 8, 2017

Related U.S. Application Data

(63) Continuation of application No. 14/952,078, filed on Nov. 25, 2015, now Pat. No. 9,600,194.

(51) Int. Cl.
*G06F 9/302* (2018.01)
*G06F 9/305* (2018.01)
(Continued)

(52) U.S. Cl.
CPC ............ *G06F 3/065* (2013.01); *G06F 3/0619* (2013.01); *G06F 3/0685* (2013.01);
(Continued)

(58) Field of Classification Search
CPC ............ G06F 9/30032; G06F 7/49994; G06F 3/0619; G06F 3/065; G06F 3/067;
(Continued)

(56) References Cited

U.S. PATENT DOCUMENTS

| 4,135,242 A | 1/1979 | Ward et al. | |
|---|---|---|---|
| 4,495,598 A * | 1/1985 | Vahlstrom | G06F 5/01 708/209 |

(Continued)

FOREIGN PATENT DOCUMENTS

CN 102318303 A 1/2012

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Daniel H Pan
(74) *Attorney, Agent, or Firm* — Steven Chiu, Esq.; Blanche E. Schiller, Esq.; Heslin Rothenberg Farley & Mesiti, P.C.

(57) ABSTRACT

An address and a data size are provided to a rotator. The rotator stores, based on the address and the data size, a data element in a location having a defined number of positions. The data element includes one or more data units and the one or more data units are aligned correctly in one or more positions of the location based on a predefined position in the location to receive a selected data unit of the one or more data units. The rotator replicates a value of a chosen data unit of the one or more data units to one or more other positions of the location.

20 Claims, 10 Drawing Sheets

(51) Int. Cl.
  G06F 9/312 (2018.01)
  G06F 3/06 (2006.01)
  G06F 12/0875 (2016.01)
  *G06F 9/30* (2018.01)
  *G06F 7/499* (2006.01)

(52) U.S. Cl.
  CPC ...... G06F 12/0875 (2013.01); *G06F 7/49994* (2013.01); *G06F 9/30018* (2013.01); *G06F 9/30021* (2013.01); *G06F 9/30032* (2013.01); *G06F 2212/452* (2013.01)

(58) Field of Classification Search
  CPC .............. G06F 3/0685; G06F 12/0875; G06F 2212/452; G06F 9/3001; G06F 9/30018
  USPC ........................ 712/221–225, 300; 708/630
  See application file for complete search history.

(56) References Cited

U.S. PATENT DOCUMENTS

| | | | |
|---|---|---|---|
| 6,748,521 B1* | 6/2004 | Hoyle | G06F 9/30014 |
| | | | 708/508 |
| 6,820,195 B1 | 11/2004 | Shephard | |
| 7,395,294 B1* | 7/2008 | Metzgen | G06F 7/57 |
| | | | 708/490 |
| 7,840,954 B2 | 11/2010 | Gschwind | |
| 8,893,104 B2 | 11/2014 | Vick et al. | |
| 8,976,816 B1 | 3/2015 | Mok et al. | |
| 9,600,194 B1* | 3/2017 | Gschwind | G06F 3/0619 |
| 2013/0315258 A1 | 11/2013 | Narvaez et al. | |
| 2014/0219294 A1 | 8/2014 | Bosshart | |

OTHER PUBLICATIONS

Pujara, P. et al., "Restrictive Compression Techniques to Increase Level 1 Cache Capacity," IEEE, Proceedings of the 2005 International Conference on Computer Design (ICCD' 05), Oct. 2005, pp. 327-333.
Metzgen, Paul, "A High Performance 32-bit ALU for Programmable Logic," ACM, Proceedings of the 2004 ACM/SIGDA 12$^{th}$ International Symposium on Field Programmable Gate Arrays, Feb. 2004, pp. 61-70.
IBM, "Power ISA—V. 2.07B," Apr. 9, 2015, pp. 1-1527.
IBM, "z/Architecture—Principles of Operation," IBM Publication No. SA22-7832-10, Eleventh Edition, Mar. 2015, pp. 1-1732.
Office Action for U.S. Appl. No. 14/952,078 dated Apr. 29, 2016, pp. 1-14.
Final Office Action for U.S. Appl. No. 14/952,078 dated Aug. 2, 2016, pp. 1-14.
Notice of Allowance for U.S. Appl. No. 14/952,078 dated Nov. 3, 2016, pp. 1-13.
Combined Search and Examination Report for GB1619797.2 dated Mar. 3, 2017, pp. 1-6.

* cited by examiner

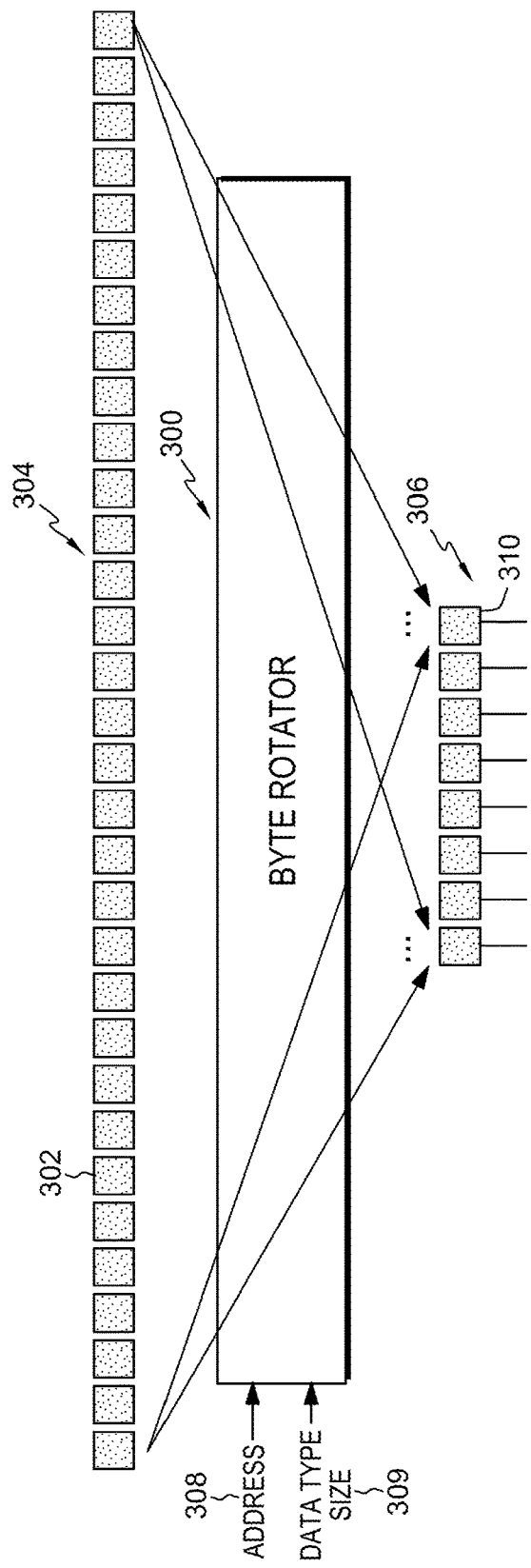

INTEGRATING SIGN EXTENSIONS FOR LOADS

PRIOR APPLICATION

This application is a continuation of co-pending U.S. application Ser. No. 14/952,078, entitled "INTEGRATING SIGN EXTENSIONS FOR LOADS," filed Nov. 25, 2015, which is hereby incorporated herein by reference in its entirety.

BACKGROUND

One or more aspects relate, in general, to processing within a computing environment, and in particular, to sign extensions of load instructions.

Computer architectures have different types of load instructions that load data from memory, such as a cache, to a register. For instance, in the z/Architecture offered by International Business Machines Corporation, Armonk, N.Y., there is a load logical instruction, and in the Power Architecture offered by International Business Machines Corporation, there is a load and zero instruction, each of which loads data of a particular size (e.g., byte, halfword, word) in a register of a larger size and then zeros out the remaining bytes of the register.

As a further example, both the z/Architecture and the Power Architecture include load instructions that load data of a particular size and then extend the sign bit in the remaining bytes.

The extending of the sign bit to the remaining bytes of the register is an expensive process.

SUMMARY

Shortcomings of the prior art are overcome and additional advantages are provided through the provision of a computer program product for providing sign extension in a computing environment. The computer program product includes a storage medium readable by a processing circuit and storing instructions for performing a method. The method includes obtaining, by a rotator, an address of a data element in memory and a data size of the data element; storing, by the rotator, based on the address and the data size, the data element in a location having a defined number of positions, wherein the data element includes one or more data units and the one or more data units are aligned correctly in one or more positions of the location based on a predefined position in the location to receive a selected data unit of the one or more data units, the rotator using decode logic to store the data element in the location; and replicating, by the rotator, a value of a chosen data unit of the one or more data units to one or more other positions of the location, the rotator using the decode logic used to store the data element in the location to replicate the value of the chosen data unit to the one or more other positions of the location.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 depicts one example of using a byte rotator to load data from a cache line to a register, in accordance with an aspect of the present invention;

DETAILED DESCRIPTION

One or more aspects relate to integrating sign and/or zero extending loads into memory access paths by way of a memory rotator. Data is extracted from memory (e.g., a cache) and placed, using a rotator, into a location, such as a register, in its appropriate positions. For instance, the data is aligned in the location, such that a least significant unit of the data (e.g., the least significant byte) is in a preselected position of the register (e.g., a least significant position of the register, which, in one example, for Big Endian systems, is byte seven of an eight byte register). Thereafter, a sign or zero extension is placed in the remaining bytes of the register using the rotator.

One embodiment of a computing environment to incorporate and/or use one or more aspects of the present invention is described with reference to FIG. 1. In one example, computing environment 100 includes at least one computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system-executable instructions, such as program modules, being executed by a computer system. Generally, program modules may include routines, programs, objects, components, logic, data structures, and so on that perform particular tasks or implement particular abstract data types.

Figure 1:
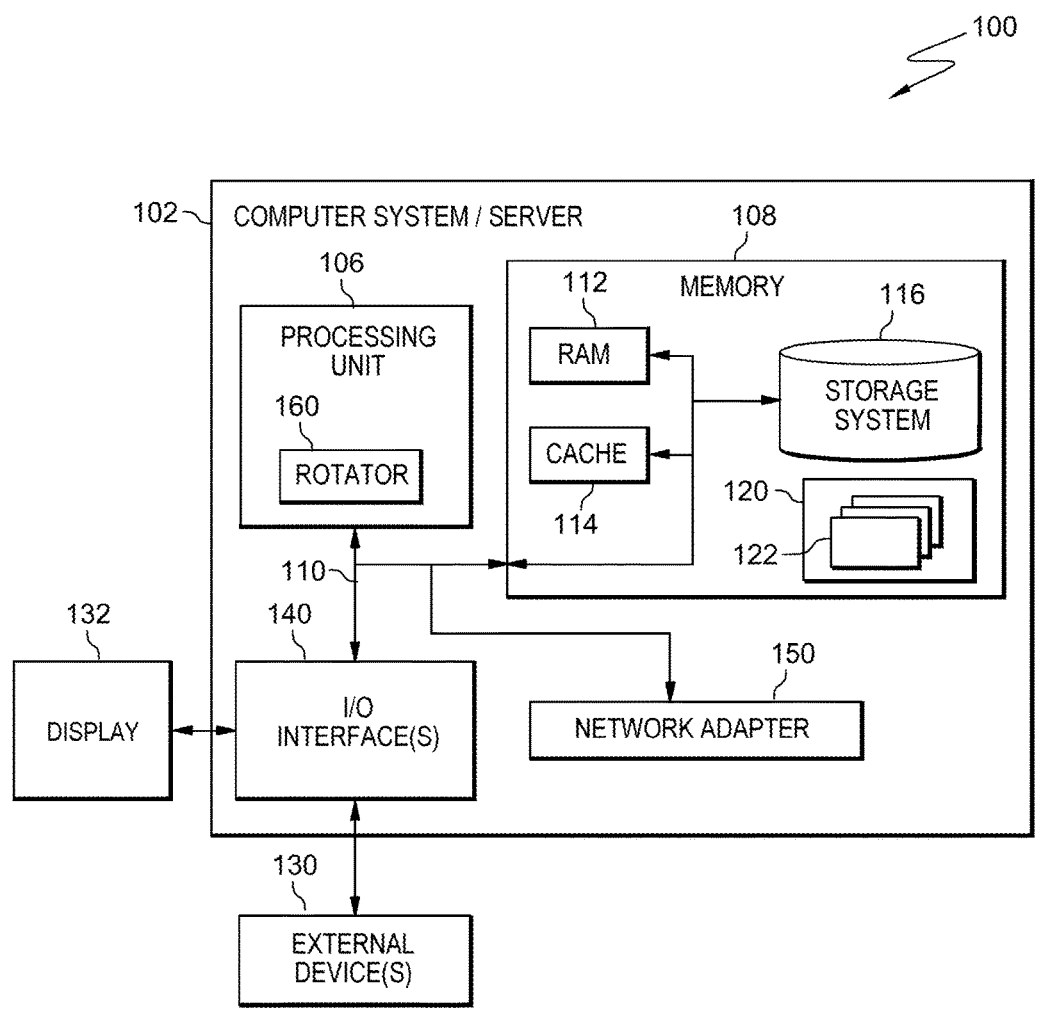
FIG. 1 depicts one example of a computer system/server of a computing environment to incorporate and/or use one or more aspects of the present invention.

As shown in FIG. 1, computer system/server 102 is shown in the form of a general-purpose computing device. The components of computer system/server 102 may include, but are not limited to, one or more processors or processing units 106, a system memory 108, and a bus 110 that couples various system components including system memory 108 to processor 106.

In one embodiment, processor 106 is based on the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y., USA. Other names used herein may be registered trademarks, trademarks, or product names of International Business Machines Corporation or other companies.

In other examples, it may be based on other architectures, such as the z/Architecture offered by International Business Machines Corporation, or other architectures offered by International Business Machines Corporation or other companies. z/Architecture is a registered trademark of International Business Machines Corporation, Armonk, N.Y., USA. One embodiment of the z/Architecture is described in "z/Architecture Principles of Operation," IBM Publication No. SA22-7832-10, March 2015, which is hereby incorporated herein by reference in its entirety.

Processor 106 includes, in one example, a memory rotator 160 used to load data from memory to a location, such as a register, as described further below.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 102 typically includes a variety of computer system readable media. Such media may be any available media that is accessible by computer system/server 102, and it includes both volatile and non-volatile media, removable and non-removable media.

System memory 108 can include computer system readable media in the form of volatile memory, such as random access memory (RAM) 112 and/or cache memory 114. Computer system/server 102 may further include other removable/non-removable, volatile/non-volatile computer system storage media. By way of example only, storage system 116 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 110 by one or more data media interfaces. As will be further depicted and described below, memory 108 may include at least one program product having a set (e.g., at least one) of program modules that are configured to carry out the functions of embodiments of the invention.

Program/utility 120, having a set (at least one) of program modules 122, may be stored in memory 108 by way of example, and not limitation, as well as an operating system, one or more application programs, other program modules, and program data. Each of the operating system, one or more application programs, other program modules, and program data or some combination thereof, may include an implementation of a networking environment. Program modules 122 generally carry out the functions and/or methodologies of embodiments of the invention as described herein.

Computer system/server 102 may also communicate with one or more external devices 130 such as a keyboard, a pointing device, a display 132, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 140. Still yet, computer system/server 102 can communicate with one or more networks such as a local area network (LAN), a general wide area network (WAN), and/or a public network (e.g., the Internet) via network adapter 150. As depicted, network adapter 150 communicates with the other components of computer system/server 102 via bus 110. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

Figure 2A:
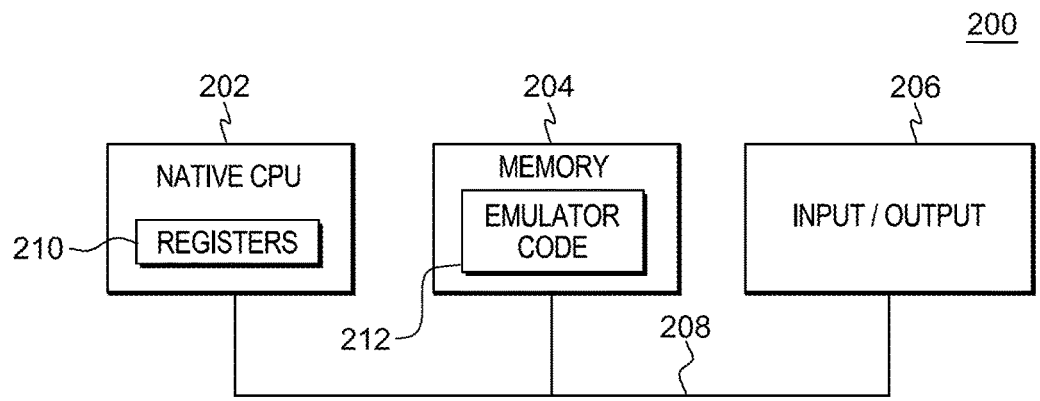
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represents the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the Power architecture, such as zSeries servers, pSeries servers, HP Superdome servers or others, to emulate the Power architecture and to execute software and instructions developed based on the Power architecture. In a further example, emulator code 212 allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 2B:
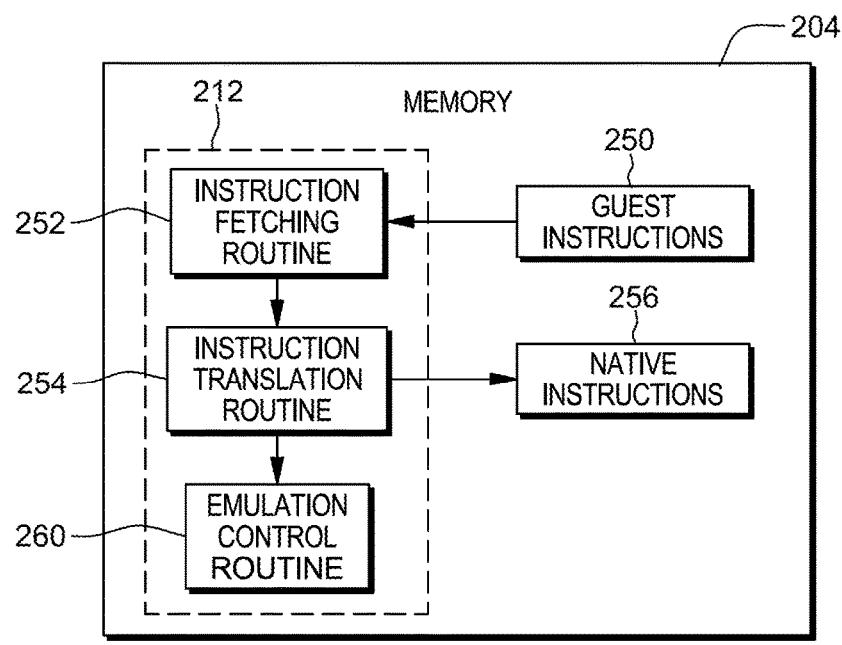
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a PowerPC processor or a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is an instruction described herein. The instruction, which is of one architecture (e.g., the Power architecture or z/Architecture), is fetched from memory, translated and represented as a sequence of native instructions 256 of another architecture (e.g., the z/Architecture, Power architecture, Intel architecture, etc.). These native instructions are then executed.

A processor executes many types of instructions to perform various operations. One type of instruction is a load instruction, which takes data from memory and places it in another location, such as a register. In particular examples, a load instruction is used to read from a cache line a data element of a particular size (e.g., byte, half-word, word, double word, etc.) and to store that data element in a register of a selected size (e.g., eight bytes). Each data element includes a plurality of data units, and the number of data units depends on the size of the data element and the size of each data unit. In one example, each data unit is a byte (e.g., bits 0-7), and therefore, a data element of a byte size has one byte; a data element of a half-word has two bytes, etc. The storing of the data element in the register includes storing the data units (i.e., the values of the data units) of the data element in the correct positions of the register. For example, the least significant byte of the data element is to be placed in the least significant byte of the register, and so forth. The least significant byte of the data element depends on the architecture. For instance, in Big Endian architectures, the rightmost byte of the data element in memory is the least significant byte, and corresponds to the rightmost byte in the register (e.g., byte 7); and in Little Endian architectures, the leftmost byte of the data element in memory is the least significant byte, and corresponds to the rightmost byte in the register (e.g., byte 0).

In one embodiment, to obtain data from memory and to store the data appropriately aligned in a location, such as a register, a memory rotator (also referred to herein as a byte rotator or rotator) is used.

One example of a memory rotator used in accordance with an aspect of the present invention is described with reference to FIG. 3. In this particular example, the rotator is a byte rotator that receives as input byte-sized data units of a data element, and places the bytes (i.e., the values of the bytes) in selected positions (e.g., bytes) in a location, such as a register. In further examples, the rotator may rotate data units of sizes other than bytes.

In one example, a byte rotator 300 reads a byte of data 302 from a cache line 304 and stores the byte of data in a register 306. In particular, the byte of data is one byte of a data element comprising one or more bytes of data. The rotator stores the byte of data in a particular position 310 of the register based on the size of the data element 309, the address in memory of the data element 308, and the particular byte of the data element being stored.

Figure 4:
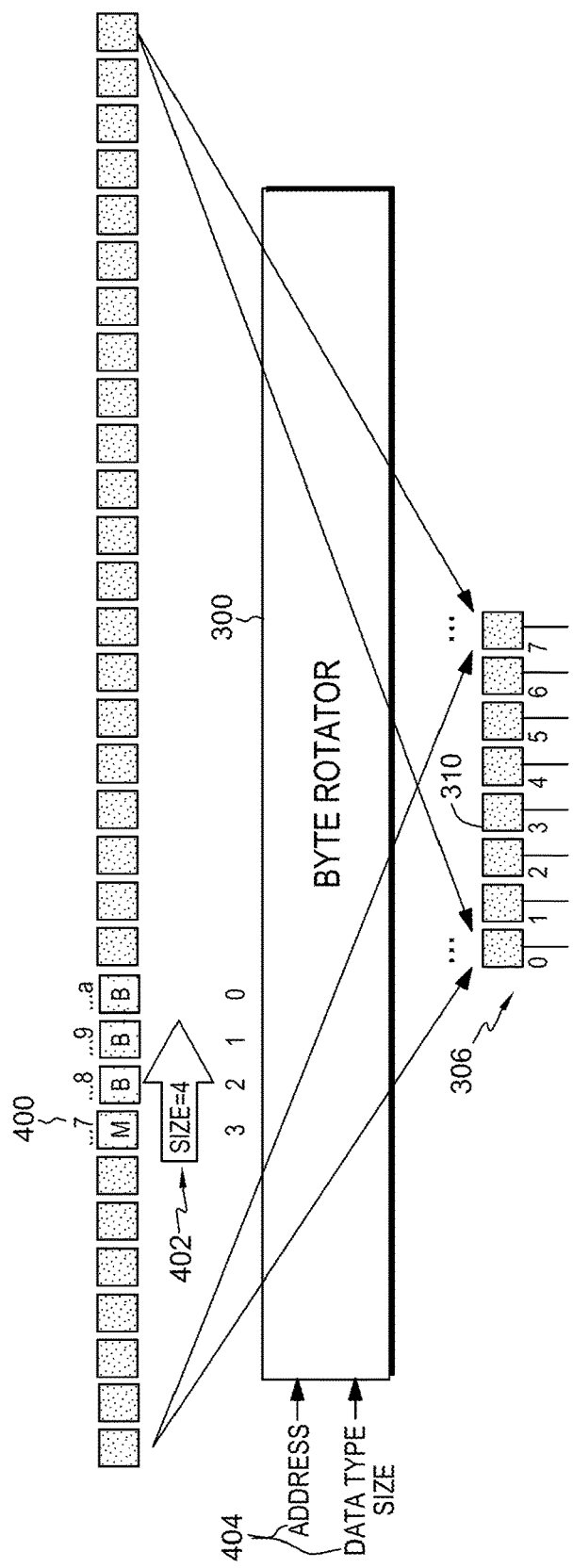
FIG. 4 depicts one example of further details associated with using a byte rotator to load data from a cache line to a register, in accordance with an aspect of the present invention.

For instance, with reference to FIG. 4, assume a data element has an address with low order bits of 0x . . . 07 (400) and the data element has a data size of 4 bytes (402). The low order bits of the address (e.g., 07) and the data size (e.g., 4) is input 404 into byte rotator 300. Byte rotator 300 then uses decode logic to place the 4 bytes of data into register 306 in appropriate positions 310. As a particular example, the least significant byte of the data element (e.g., the rightmost byte of a value stored in memory—that is, the byte with the highest address—in a Big Endian architecture) is placed in the least significant byte of the register (e.g., the last byte of the register, e.g., byte 7, in a Big Endian architecture). For example, the byte labelled 0 of the data element is placed in byte 7 of the register; the byte labelled 1 of the data element is placed in byte 6 of the register; the byte labelled 2 of the data element is placed in byte 5 of the register; and the byte labelled 3 of the data element is placed in byte 4 of the register.

Additionally, in accordance with an aspect of the present invention, the byte rotator is used to place a copy of the most significant byte of the data element (e.g., byte 3 of this example) in each remaining byte of the register.

One embodiment of the logic used by the rotator to load the register, as indicated above, includes:
 Byte (8−i)=cache_byte(datasize−i+address (low_order_bits)) if i<=data size, else Byte (8−i)=cache_byte(address(low_order_bits)) if i>data size Particularly, using the above example:

Initially, if i<=1, the data size=4, and the address of low_order_bits=7, then:
    Since 1<=4, Byte (8−1=7)=cache_byte(4−1+7=10), thus
    Byte 7 of the register is loaded with the byte at address 10 (hex a) of the cache line.

Similarly, if i=2, then:
    Since 2<=4, Byte (8−2=6)=cache_byte(4−2+7=9), thus
    Byte 6 of the register is loaded with the byte at address 9 of the cache line.

Further, if i=3, then:
    Since 3<=4, Byte (8−3=5)=cache_byte(4−3+7=8), thus
    Byte 5 of the register is loaded with the byte at address 8 of the cache line.

Further, if i=4, then:
    Since 4<=4, Byte (8−4=4)=cache_byte(4−4+7=7), thus
    Byte 4 of the register is loaded with the byte at address 7 of the cache line.

Yet further, if i=5, then:
    Since 5>4, Byte (8−5=3)=cache_byte(7), thus
    Byte 3 of the register is loaded with the byte at address 7 of the cache line.

Similarly, bytes 2, 1 and 0 are loaded with the byte at address 7, since when i is greater than (or equal to) the data size, the byte of the register is loaded with the most significant byte of the data element, which in this example is the byte at address 7. Therefore, the byte rotator is used to load the register at the appropriate positions, as well as store the most significant byte in each remaining byte of the register, extending the sign byte to each remaining position of the register that does not receive the data element.

The above rotation is pictorially depicted in the register, as the following:
    Loaded signed byte: MMMMMMMM
    Loaded signed halfword: MMMMMMMB
    Loaded signed word: MMMMMBBB The above logic may be generalized to the following (for an example Big Endian embodiment):
    For i=1 to the data size: Position (X−i) of the register=cache (the data size−i+the address); and
    For i=(the data size+1) to the number of positions: Position (X−i) of the register=cache (address), where X is the number of positions in the register, and the register includes position 0 to position X−i.

Thus, using the rotator, as described herein, the signed data unit (e.g., byte) is stored in each position of the register, except for the one or more positions loaded with non-signed data from the cache.

In another embodiment, the same logic may be applied to other byte orderings. For example, in one embodiment for Little Endian data, in which the least significant byte is byte 0 on the rightmost side of a register, and where the least significant byte of a word in memory at the smallest address (i.e., the leftmost byte of a value stored in memory—that is, the byte with the lowest address—in a Little Endian architecture) is placed in the least significant byte of the register, the following logic may be performed by the rotator:
    For i=1 to the data size: Position (i−1) of the register=cache (the address+i−1); and
    For i=(the data size+1) to the number of positions: Position (i−1) of the register=cache (address+data size−1), where X is the number of positions in the register, and the register includes position 0 to position X−1.

Yet other embodiments of aligning data for other byte ordering schemes in accordance with the teachings herein are contemplated.

In one embodiment directed at handling multiple byte endian ordering schemes in a single implementation, a rotator may be adapted to perform data alignment formatting, and replicating most significant bytes, for a plurality of byte orders, under the control of a byte order control input. In one or more embodiments, the control input may be set by a mode switch selecting between a first and a second data order, an instruction selecting between a first and a second data order, or a combination of the two. In one embodiment in accordance with the Power Architecture, the data order control corresponds to the "LE" control bit of the machine state register which selects between a first and second ordering. In one embodiment, the selector may be based on an indicator for byte reverse instructions, when an architecture supports sign-extending byte reverse instructions. In yet another embodiment, it may be combined based on combinations of an "LE" control bit of the machine state register and an indicator for byte reverse instructions. Other possibilities also exist.

In accordance with one or more embodiments, irrespective of byte ordering schemes and controls used to indicate such schemes, when more than one scheme is supported, a most significant byte (or other selected data unit) of a specified memory datum containing the most significant bit (or other selected bit) is replicated to at least one byte position not directly corresponding to a loaded byte of the memory datum.

Then, in a further embodiment, in addition to replicating a chosen data unit (e.g., the most significant data unit), the sign value within each replicated most significant data unit (or other chosen data unit) of the register (e.g., bytes 0-3 in this example) is replicated within each byte.

Figure 5:
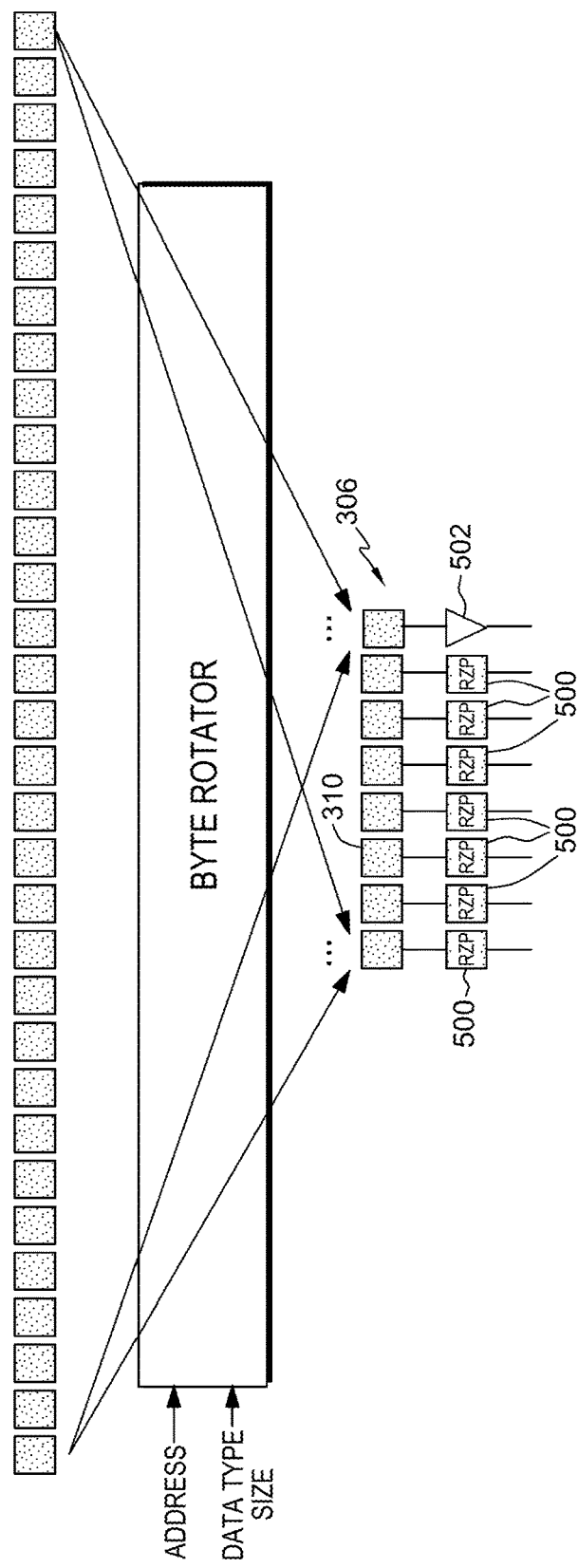
FIG. 5 depicts one example of using replicate circuits to replicate a sign value and/or a zero, in accordance with an aspect of the present invention.

In one example, the replication within the data unit (e.g., the byte) is performed using a replicate circuit, examples of which are depicted of FIG. 5. As shown in FIG. 5, in one example, each position of the register, with the exception of the least significant byte, is coupled to a replicate circuit 500. That is, in this example, an output of a byte of the register capturing the result of the rotator is input to either a pass through buffer 502, if it is the least significant byte, or to a replicate circuit 500, before being used for further processing or storage in a register file. Further details of a replicate circuit 500 are described with reference to FIG. 6.

Figure 6:
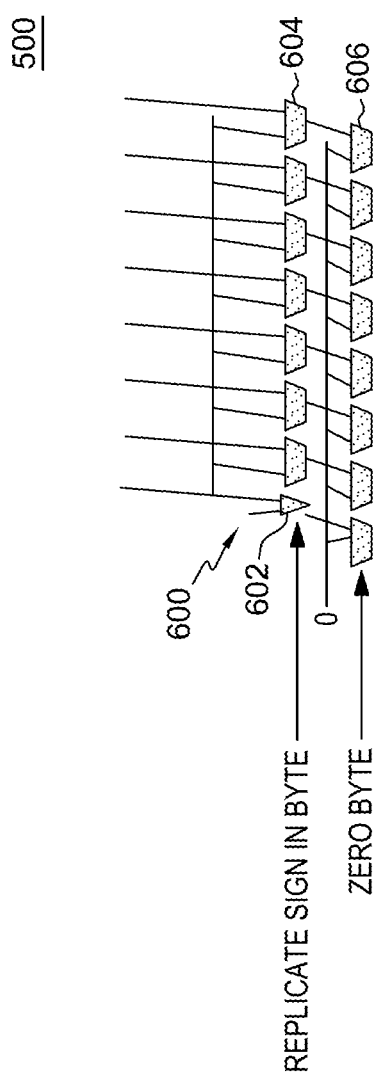
FIG. 6 depicts further details of a replicate circuit, in accordance with an aspect of the present invention.

In one example, referring to FIG. 6, replicate circuit 500 includes a sub-component 600 for each bit of the register byte coupled to the replicate circuit. The sub-components include a buffer 602 for the first bit of the byte and a multiplexor 604 for each remaining bit of the byte. The buffer 602 just passes the input data bit out, and the multiplexor either selects the value of the input data bit or the value of the sign bit depending on the selection control of the multiplexor. Thus, the output of the replicate circuit is, in one example, a replicated sign value.

However, in a further embodiment, optionally, a plurality of additional multiplexors 606 is provided that may be used to zero the byte. That is, the output of the first layer of multiplexors/buffer may be a replicated sign, but that output may optionally be input to another layer of multiplexors 606, which may select between the replicated sign or a zero, if the byte is to be zeroed out.

Further, one skilled in the art will understand how to design other circuits accomplishing a similar logic function, e.g., using an AND gate in one example embodiment in lieu of the zeroing multiplexor, a NAND gate in another example embodiment in lieu of the zeroing multiplexor, and so forth. In yet other embodiments, multiple logic functions may be combined into a single logic function, or the sequence of processing steps may be reordered without affecting the logic function. A variety of logic transformation steps are known to those skilled in the art which may be applied without limiting the applicability of this circuit.

As described herein, a sign and/or zero extension capability is provided that facilitates extending the sign value or a zero in positions within the register that are not loaded with data from the cache. In one embodiment, the replication is integrated into transmission logic of bits from the load/store unit to the register file. In another embodiment, it is integrated into data receive logic in the unit containing the register file. In another embodiment, the logic is integrated into the bit write logic of the register file. In yet another embodiment, at least one signal is stored in the register file in conjunction with the value, and a final sign bit replication, or portion thereof is performed in the register file read logic or operand multiplexor.

In one embodiment, controls to determine whether for a specific data unit, sign bits are to be replicated depend on the position and the data type size. Thus, if a byte corresponds to a loaded byte, the loaded byte is to be passed directly. Conversely, if the byte contains a replicated most significant byte, the most significant bit of that most significant byte (i.e., the sign bit) may be replicated to all bit positions in a byte. The same is true for other data sizes.

This logic may be generalized (e.g., for a Big Endian embodiment) as:

For i=1 to the data size: operation of replication circuit coupled to position (X−i) of the register=pass byte.

For i=(the data size+1) to the number of positions: operation of replication circuit coupled to position (X−i) of the register=replicate most significant bit into all bits of subject byte.

If loads with zero and sign extending functions are supported by the replication circuit, e.g., the circuit of FIG. 6, then the operation to be performed by a respective replication circuit may be determined as follows:

For i=1 to the data size: operation of replication circuit coupled to position (X−i) of the register=pass byte.

For i=(the data size+1) to the number of positions:
if a sign extended load is being performed, operation of replication circuit coupled to position (X−i) of the register=replicate most significant bit into all bits of subject byte; otherwise, a zero extended load is being performed, operation of replication circuit coupled to position (X−i) of the register=zero all bits.

Similar functions may be performed for other bye orderings, by adjusting the number of bit and bye positions in accordance with a specific one of alternate data orderings (e.g., Little Endian data ordering), and/or for other sizes of data units.

One embodiment of logic to extend the sign and/or zero bit is described with reference to FIGS. 7A-7B.

Figure 7A:
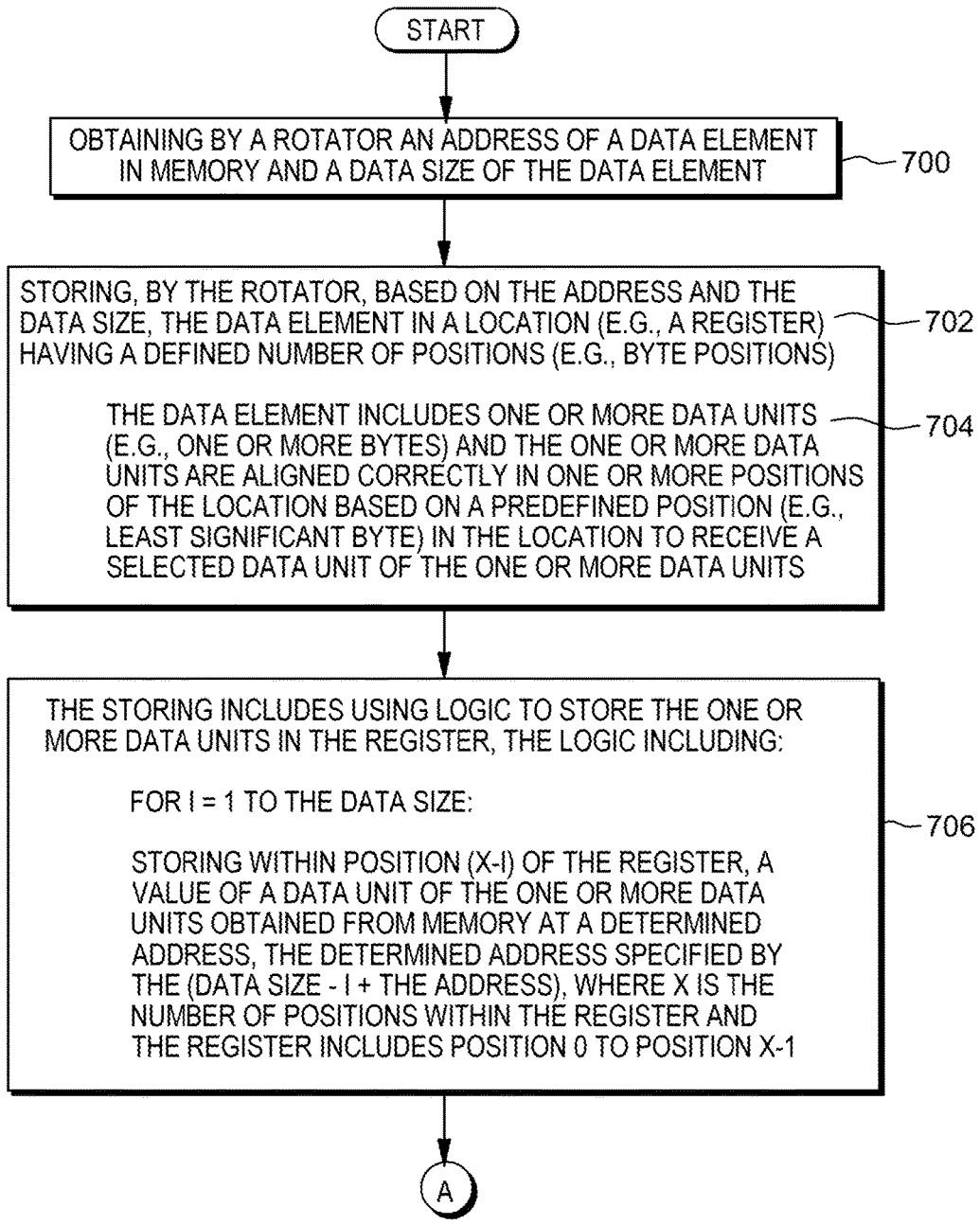
FIGS. 7A-7B depict one embodiment of logic to perform a sign and/or zero extension, in accordance with an aspect of the present invention.

Referring to FIG. 7A, initially, in one aspect, a rotator (such as rotator 300) obtains an address of a data element in memory and a data size of the data element, STEP 700. The address is, for instance, the low_order_bits of a memory address. The memory address is used to access, for instance, a cache line in memory and the address of the data element is used to locate the data element within the cache line.

The rotator stores, based on the address and the data size, the data element in a location (e.g., a register) having a defined number of positions (e.g., byte positions), STEP 702. The data element includes one or more data units (e.g., one or more bytes) and the one or more data units are aligned correctly in one or more positions of the location based on a predefined position (e.g., least significant byte) in the location to receive a selected data unit of the one or more data units (704).

The storing includes, in one embodiment, using logic to store the one or more data units in the register, STEP 706. In one example, the logic includes:

For i=1 to the data size:
Storing within position (X−i) of the register, a value of a data unit of the one or more data units obtained from memory at a determined address, the determined address specified by (the data size−i+the address), where X is the number of positions within the register and the register includes position 0 to position X−1.

Figure 7B:
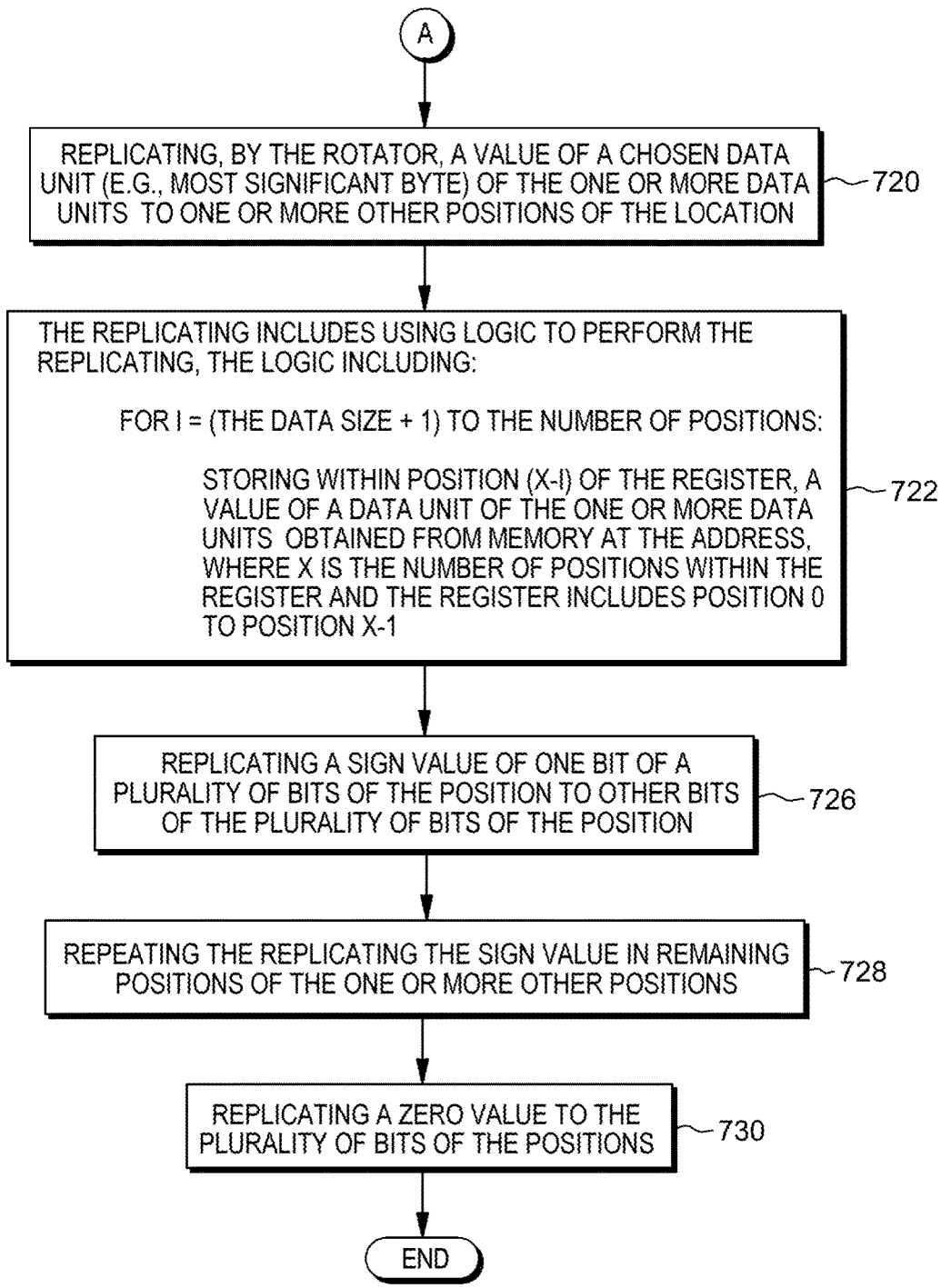

Additionally, the rotator replicates a value of a chosen data unit (e.g., the most significant byte) of the one or more data units to one or more other positions of the location, STEP 720 (FIG. 7B). The replicating includes, in one embodiment, using logic to perform the replicating, STEP 722. The logic includes, for instance:

For i=(the data size+1) to the number of positions:
Storing within position (X−i) of the register, a value of a data unit of the one or more data units obtained from memory at the address, where X is the number of positions within the register and the register includes position 0 to position X−1.

Further, in one aspect, a sign value of one bit of a plurality of bits of a position is replicated to other bits of the plurality of bits of the position, STEP 726. The replicating of the sign value is repeated in remaining positions of the one or more other positions, STEP 728. In yet a further aspect, a zero value is replicated to the plurality of bits of the position(s), STEP 730.

Described in detail herein is a capability to use a rotator to correctly place data units (e.g., bytes) of a data element in a location (e.g., a register), such that the data units are correctly aligned (e.g., the least significant byte is in a particular position of the register (e.g., byte 7 in Big Endian or byte 0 in Little Endian)). In one embodiment, the rotation logic is based on an address of the data element in memory and the data size of the data element. Further, it includes a sign and/or zero extension based on the nature of an instruction specified access.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

A schematic of an example of a cloud computing node is shown in FIG. 1. For instance, a cloud computing node may include a computer system/server 102, which is only one example of a suitable cloud computing node and is not intended to suggest any limitation as to the scope of use or functionality of embodiments of the invention described herein. Regardless, cloud computing node is capable of being implemented and/or performing any of the functionality set forth hereinabove.

Figure 8:
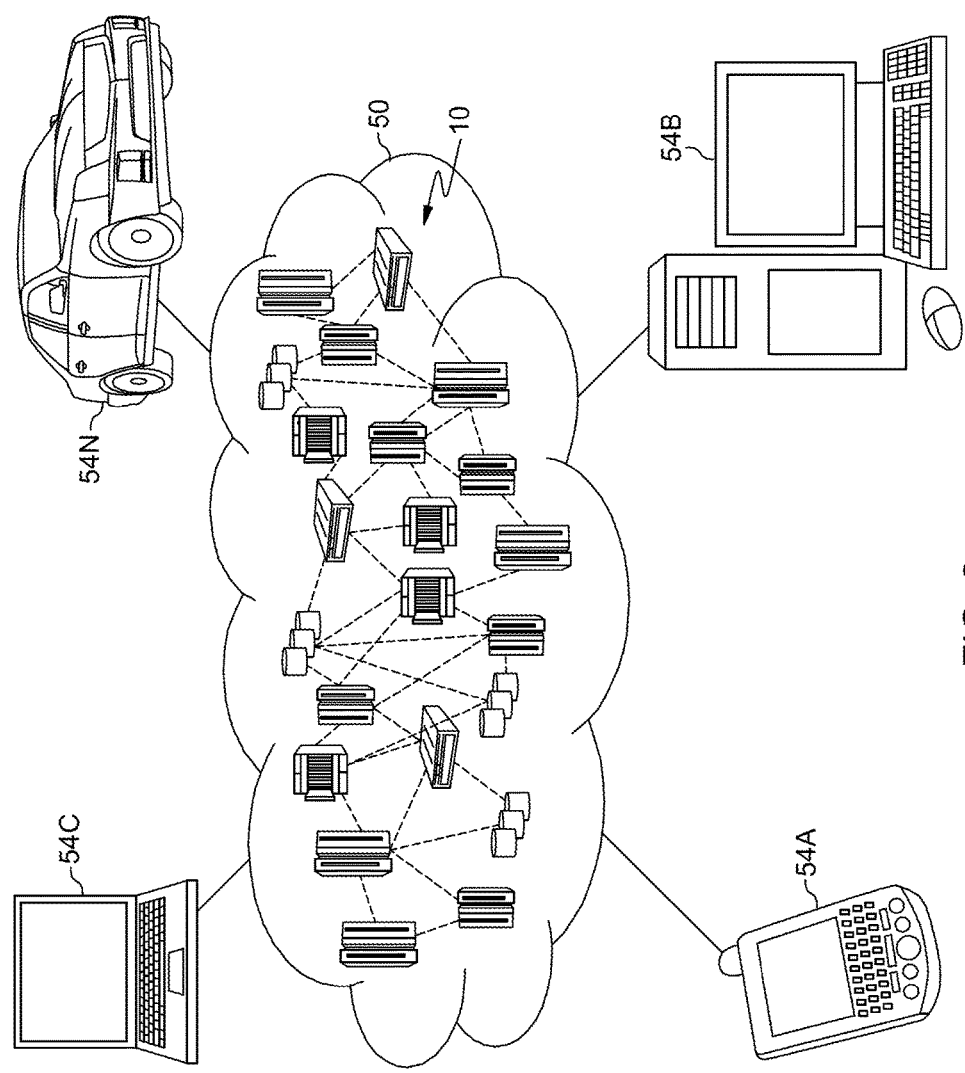
FIG. 8 depicts one embodiment of a cloud computing environment.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
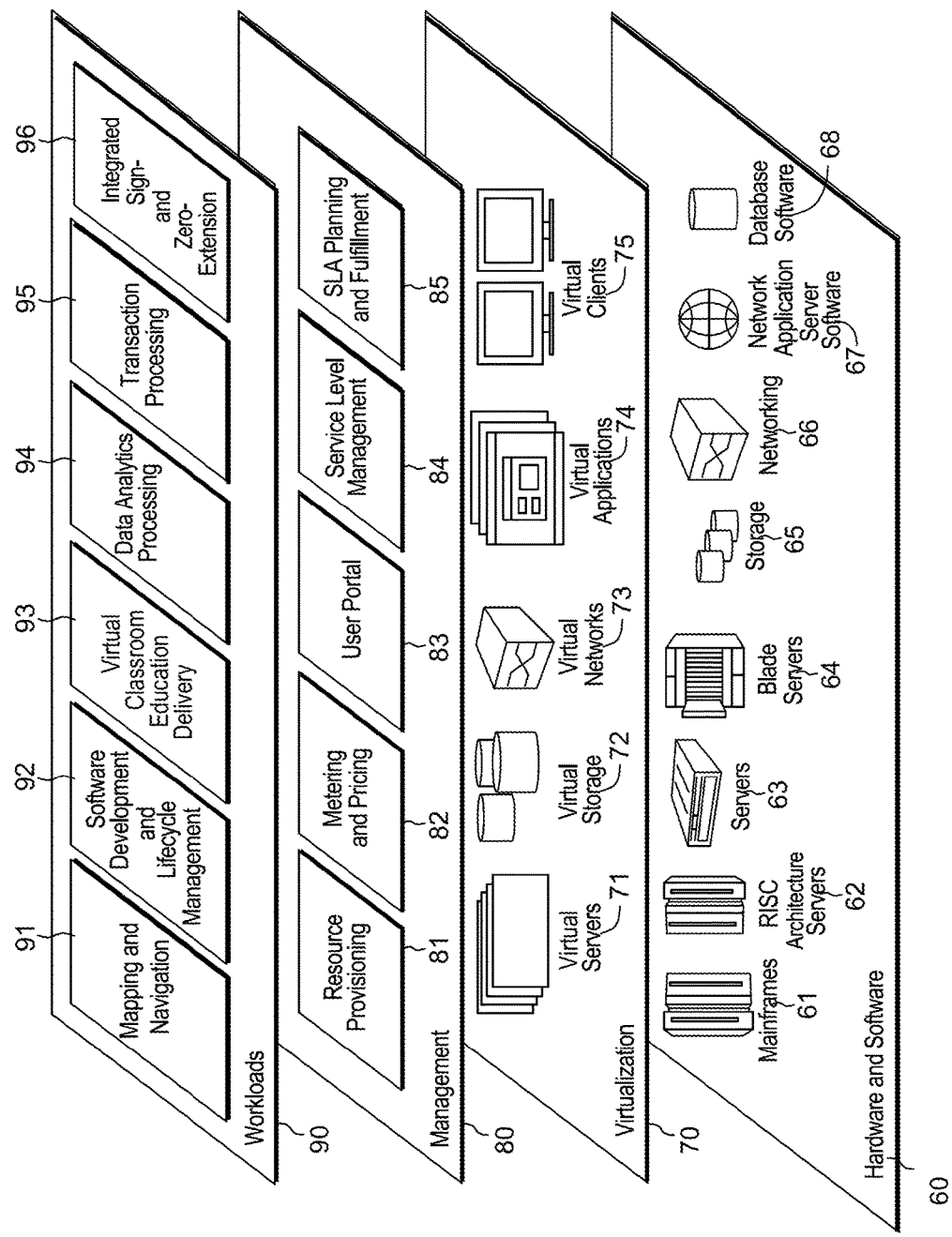
FIG. 9 depicts one example of abstraction model layers.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and integrated sign- and/or zero-extension processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for providing sign extension in a computing environment, said computer program product comprising:
   a non-transitory computer readable storage medium readable by a processing circuit and storing instructions for performing the following comprising:
      obtaining, by a rotator, an address of a data element in memory and a data size of the data element, the rotator operating in multiples of data units having a predefined size;
      storing, by the rotator, based on the address and the data size, the data element in a register having a defined number of positions, wherein the data element includes one or more data units and the one or more data units are aligned correctly in one or more positions of the register based on a predefined position in the register to receive a selected data unit of the one or more data units, the rotator using decode logic to store the data element in the register; and
      replicating, by the rotator, a value of a chosen data unit of the one or more data units to one or more other positions of the register, the chosen data unit comprising a plurality of bits and being of the predefined size, the rotator using the decode logic used to store the data element in the register to replicate the value of the chosen data unit to the one or more other positions of the register not storing the data element.

2. The computer program product of claim 1, wherein the defined number of positions comprises a defined number of byte positions of the register, and the one or more data units of the data element comprise one or more bytes of the data element.

3. The computer program product of claim 2, wherein the predefined position is a least significant byte of the defined number of byte positions of the register, and the chosen data unit is the most significant byte of the data element.

4. The computer program product of claim 1, wherein the storing comprises using logic to store the one or more data units in the register, the logic comprising:
   For i=1 to the data size:
      storing within position (X−i) of register, a value of a data unit of the one or more data units obtained from memory at a determined address, the determined address specified by (the data size−i+the address), where X is the defined number of positions within the register and the register includes position 0 to position X−1.

5. The computer program product of claim 1, wherein the replicating comprises using logic to perform the replicating, the logic comprising:
   For i=(the data size+1) to the defined number of positions:
      storing within position (X−i) of the register, a value of a data unit of the one or more data units obtained from memory at the address, where X is the defined number of positions within the register and the register includes position 0 to position X−1.

6. The computer program product of claim 1, wherein the chosen data unit is a most significant data unit of the data element.

7. The computer program product of claim 1, wherein a position of the one or more other positions comprises a plurality of bits, and wherein the performing further comprises replicating a sign value of one bit of the plurality of bits of the position to other bits of the plurality of bits of the position.

8. The computer program product of claim 7, wherein the performing further comprises repeating the replicating the sign value in remaining positions of the one or more other positions.

9. The computer program product of claim 7, wherein the performing further comprises replicating a zero value to the plurality of bits of the position.

10. The computer program product of claim 1, wherein a position of the one or more other positions comprises a plurality of bits, and wherein the performing further comprises replicating a zero value to the plurality of bits of the position.

11. A computer system for providing sign extension in a computing environment, said computer system comprising:
   a memory; and
   a processor in communication with the memory, wherein the computer system is configured to perform the following comprising:
      obtaining, by a rotator, an address of a data element in memory and a data size of the data element, the rotator operating in multiples of data units having a predefined size;
      storing, by the rotator, based on the address and the data size, the data element in a register having a defined number of positions, wherein the data element includes one or more data units and the one or more data units are aligned correctly in one or more positions of the register based on a predefined position in the register to receive a selected data unit of the one or more data units, the rotator using decode logic to store the data element in the register; and
      replicating, by the rotator, a value of a chosen data unit of the one or more data units to one or more other positions of the register, the chosen data unit comprising a plurality of bits and being of the predefined size, the rotator using the decode logic used to store the data element in the register to replicate the value of the chosen data unit to the one or more other positions of the register not storing the data element.

12. The computer system of claim 11, wherein the storing comprises using logic to store the one or more data units in the register, the logic comprising:
   For i=1 to the data size:
      storing within position (X−i) of the register, a value of a data unit of the one or more data units obtained from memory at a determined address, the determined address specified by (the data size−i+the address), where X is the defined number of positions within the register and the register includes position 0 to position X−1.

13. The computer system of claim 11, wherein the replicating comprises using logic to perform the replicating, the logic comprising:
For i=(the data size+1) to the defined number of positions:
storing within position (X−i) of the register, a value of a data unit of the one or more data units obtained from memory at the address, where X is the number of positions within the register and the register includes position 0 to position X−1.

14. The computer system of claim 11, wherein a position of the one or more other positions comprises a plurality of bits, and wherein the computer system is further configured to perform the following comprising:
replicating a sign value of one bit of the plurality of bits of the position to other bits of the plurality of bits of the position; and
repeating the replicating the sign value for remaining positions of the one or more other positions.

15. The computer system of claim 11, wherein a position of the one or more other positions comprises a plurality of bits, and wherein the computer system is further configured to perform the following comprising replicating a zero value to the plurality of bits of the position.

16. A computer-implemented method of providing sign extension in a computing environment, said computer-implemented method comprising:
obtaining, by a rotator, an address of a data element in memory and a data size of the data element, the rotator operating in multiples of data units having a predefined size;
storing, by the rotator, based on the address and the data size, the data element in a register having a defined number of positions, wherein the data element includes one or more data units and the one or more data units are aligned correctly in one or more positions of the register based on a predefined position in the register to receive a selected data unit of the one or more data units, the rotator using decode logic to store the data element in the register; and
replicating, by the rotator, a value of a chosen data unit of the one or more data units to one or more other positions of the register, the chosen data unit comprising a plurality of bits and being of the predefined size, the rotator using the decode logic used to store the data element in the register to replicate the value of the chosen data unit to the one or more other positions of the register not storing the data element.

17. The computer-implemented method of claim 16, wherein the storing comprises using logic to store the one or more data units in the register, the logic comprising:
For i=1 to the data size:
storing within position (X−i) of the register, a value of a data unit of the one or more data units obtained from memory at a determined address, the determined address specified by (the data size−i+the address), where X is the defined number of positions within the register and the register includes position 0 to position X−1.

18. The computer-implemented method of claim 16, wherein the replicating comprises using logic to perform the replicating, the logic comprising:
For i=(the data size+1) to the number of positions:
storing within position (X−i) of the register, a value of the data unit of the one or more data units obtained from memory at the address, where X is the defined number of positions within the register and the register includes position 0 to position X−1.

19. The computer-implemented method of claim 16, wherein a position of the one or more other positions comprises a plurality of bits, and wherein the method further comprises:
replicating a sign value of one bit of the plurality of bits of the position to other bits of the plurality of bits of the position; and
repeating the replicating the sign value for remaining positions of the one or more other positions.

20. The computer-implemented method of claim 16, wherein a position of the one or more other positions comprises a plurality of bits, and wherein the method further comprises replicating a zero value to the plurality of bits of the position.

* * * * *